United States Patent
Raya et al.

(10) Patent No.: US 7,407,384 B2
(45) Date of Patent: Aug. 5, 2008

(54) SYSTEM, METHOD AND DEVICE FOR LANGUAGE EDUCATION THROUGH A VOICE PORTAL SERVER

(75) Inventors: Madhuri Raya, Palo Alto, CA (US); Karsten Funk, Mountain View, CA (US); Sharmila Ravula, Union City, CA (US); Yao Meng, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 607 days.

(21) Appl. No.: 10/448,919

(22) Filed: May 29, 2003

(65) Prior Publication Data
US 2004/0241625 A1    Dec. 2, 2004

(51) Int. Cl.
G09B 1/00    (2006.01)
G09B 19/00    (2006.01)

(52) U.S. Cl. .................. 434/167; 434/156; 434/157; 434/350

(58) Field of Classification Search .......... 434/156, 434/157, 169, 308, 350; 704/270, 270.1, 704/277
See application file for complete search history.

(56) References Cited

U.S. PATENT DOCUMENTS

| | | | |
|---|---|---|---|
| 5,679,001 A * | 10/1997 | Russell et al. | 434/185 |
| 5,766,015 A * | 6/1998 | Shpiro | 434/156 |
| 5,808,908 A * | 9/1998 | Ghahramani | 702/182 |
| 5,857,173 A * | 1/1999 | Beard et al. | 704/276 |
| 5,885,083 A * | 3/1999 | Ferrell | 434/156 |
| 2002/0086268 A1 * | 7/2002 | Shpiro | 434/156 |
| 2002/0086269 A1 * | 7/2002 | Shpiro | 434/156 |
| 2002/0115044 A1 * | 8/2002 | Shpiro | 434/156 |
| 2002/0182571 A1 * | 12/2002 | McCormick et al. | 434/157 |
| 2004/0078204 A1 * | 4/2004 | Segond et al. | 704/277 |

* cited by examiner

Primary Examiner—Robert E. Pezzuto
Assistant Examiner—Banafsheh Hadizonooz
(74) Attorney, Agent, or Firm—Keyon & Keyon LLP

(57) ABSTRACT

A method of teaching pronunciation is provided which includes communicating by a voice portal server to a user a model word and detecting a response by the user to the voice portal server. The method also includes comparing the response word to the model word and determining a confidence level based on the comparison of the response word to the model word. The method further includes comparing an acceptance limit to the confidence level and confirming a correct pronunciation of the model word if the confidence level one of equals and exceeds the acceptance limit.

9 Claims, 5 Drawing Sheets

SYSTEM, METHOD AND DEVICE FOR LANGUAGE EDUCATION THROUGH A VOICE PORTAL SERVER

FIELD OF THE INVENTION

The present invention relates to a method of language instruction, and a system and device for implementing the method. In particular, the present invention relates to a method for learning a language using a voice portal.

BACKGROUND INFORMATION

Learning a new language may be a difficult task. With increasing globalization, being able to communicate in multiple languages has also become a skill that may provide an edge, including, for example, in career advancement. The quality of the experience of visiting a country, whether for pleasure or business, may be enhanced by even a rudimentary knowledge of the local language. There are various ways to learn a language, including by reading books, taking classes, viewing internet sites, and listening to books-on-tape.

It is believed that an important aspect of learning a language is learning correct pronunciation and language usage. Practicing pronunciation and usage may be a critical aspect of properly learning a language.

It is believed that available language learning tools may have various disadvantages. For example, learning from a book or books-on-tape is not an interactive process, and therefore the student may fall into the habit of incorrect usage. Attending a class may be helpful, but it may also be inconvenient because of a busy schedule, especially for professionals. Also, students may lose interest in learning if they feel that they are not able to cope with the pace of the class.

A tool that teaches pronunciation and usage, and which can be used at the student's own leisure, would be very convenient and useful. It is therefore believed that there is a need for providing a method and system of providing convenient, effective and/or inexpensive language instruction.

SUMMARY OF THE INVENTION

An exemplary method of the present invention is directed to providing teaching pronunciation which includes communicating by a voice portal server to a user a model word and detecting a response by the user to the voice portal server. The exemplary method also includes comparing the response word to the model word and determining a confidence level based on the comparison of the response word to the model word, and comparing an acceptance limit to the confidence level and confirming a correct pronunciation of the model word if the confidence level one of equals and exceeds the acceptance limit.

An exemplary system of the present invention is directed to providing a system which includes a voice portal, a communication device adapted to be coupled with the voice portal server, and an application server adapted to be electrically coupled with the voice portal. In the exemplary system, the voice portal compares at least one word spoken by a user into the communication device with a phrase provided by the application server to determine a confidence level.

An exemplary method of the present invention is directed to providing for a language teaching method which includes communicating a prompt to a user by a voice portal, detecting a response by the user to the voice portal, parsing the response into at least one uttered phrase, each of the at least one uttered phrase associated with a corresponding at least one slot. The exemplary method further includes comparing each of the at least one uttered phrase associated with the corresponding at least one slot with at least one stored phrase, the at least one stored phrase associated with the corresponding at least one slot, and determining a confidence level based on the comparison of each uttered phrase with each stored phrase corresponding to the at least one slot. The exemplary method further includes comparing an acceptance limit to each confidence level, the acceptance limit associated with each stored phrase, and confirming that at least one uttered phrase corresponds to each stored phrase if the confidence level of one equals or exceeds the associated acceptance limit.

The exemplary method and/or system of the present invention may provide a user accessible service which may be used at the user's convenience, at any time. The exemplary system may track a user's knowledge, experience, and progress. The exemplary system may check on the pronunciation of words/phrases/sentences, as well as identify the correct word usage with an incorrect pronunciation. The exemplary system may also assess a user's performance (such information may be used to decide to go to the next level), and may make scheduled calls to improve a user's interaction skills and readiness in the foreign language. The user may be able to decide to be trained on specific topics or grammars (such as, for exemple, financial or technical).

DETAILED DESCRIPTION

The voice portal may be used as an interactive tool to learn a new language. Speech recognition and playback features may enable the system to provide a simulated, classroom-like environment to the user. According to an exemplary method of the present invention, the method provides an interactive tool that can correct pronunciation and grammar and that can be accessed at any time.

Figure 1:
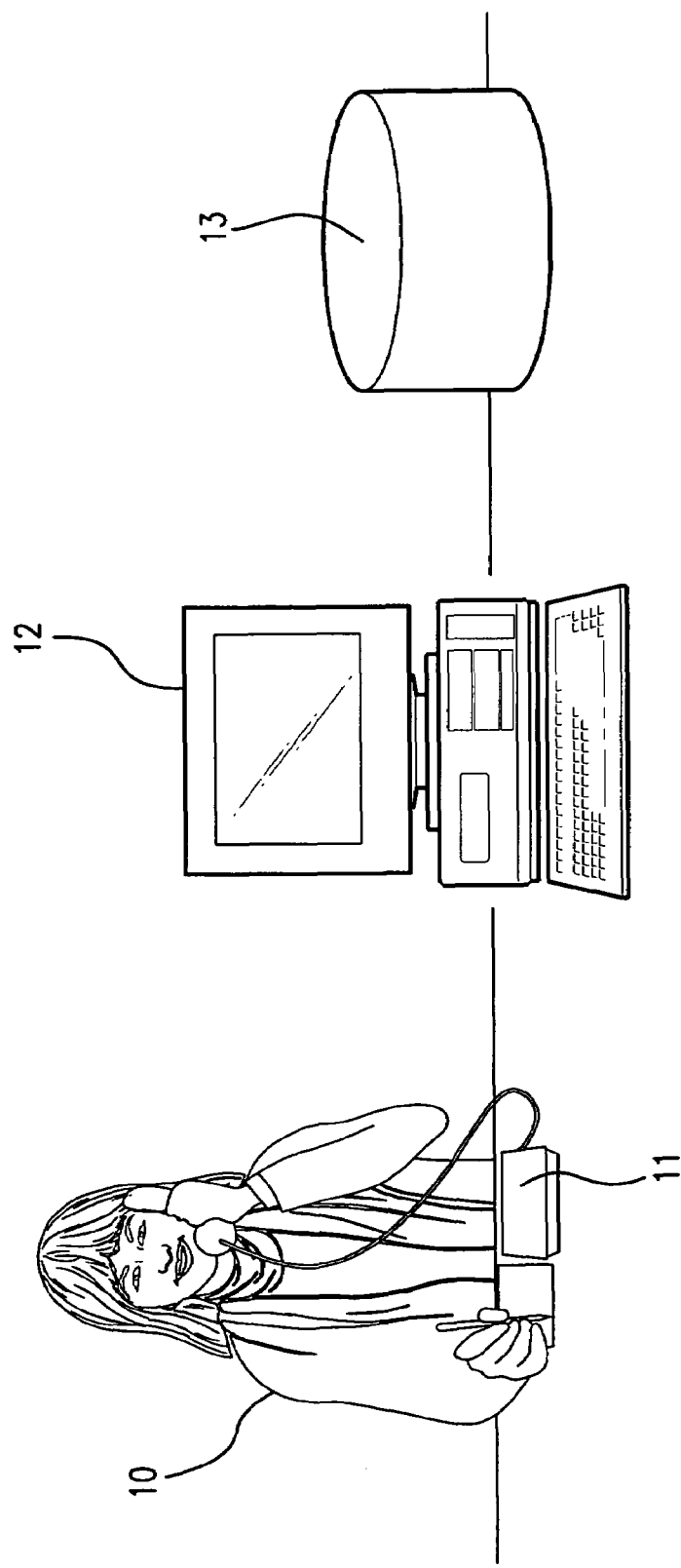
FIG. 1 shows an exemplary embodiment of a system of the present invention showing a user, a voice portal and a database.

FIG. 1 shows a schematic diagram of the system. A voice portal (also referred to as a voice portal server) 12 may be used to recognize proper pronunciation and may be used as an interactive language instruction tool. FIG. 1 shows the voice portal 12 which operates as an interactive tool for learning a language. A user 10 may call the voice portal 12. The voice portal 12 may then pull up the profile of the user 10 and begin providing the user 10 with a corresponding tutorial.

The user 10 may use a telephone 11 to access the voice portal 12 by calling a telephone number. Alternative methods for the user 10 to access the voice portal 12 may include the use of a personal computer. The voice portal 12 may access a database 13, which may include a pool of valid, stored phrases (alternatively referred to as grammar files) for various languages, including different dialects within each language. The database 13 may also include different lesson plans depending on the student goals (for example, traveling, conversation, business, academic, etc.). The database 13 may also include a record of the previous lessons presented to user 10, as well as a progress report which may include areas of strengths and weaknesses.

An exemplary system of the present invention may introduce the use of the voice portal 12 as a tool for learning specific languages. The system may provide a structured learning process to the user 10 through a simple call to the voice portal 12. This instruction may include tutorials and tests to provide the user 10 with a class-like environment, and may provide the user 10 with the flexibility to take lessons and practice by calling the voice portal 12 at any time.

The voice portal 12 may include a server connected to the telephone system or another communication network to provide speech recognition and text-to-speech capabilities over the telephone 11 or another communication device. The voice portal 12 may be used to provide different types of information, including, for example, news, weather reports, stock quotes, etc. The voice portal 12 may also maintain profiles of the user 10, so that the user 10 can access E-mail, a calendar, or address entries.

An exemplary system of the present invention uses the voice portal 12 to replicate a language class with pseudo student-teacher interaction. The voice portal 12 operates as a "teacher" to correct the student (the user 10), by providing the user 10 with a method of immediate feedback on correctly pronouncing words and correctly using grammar. The voice portal 12 can also store a profile of the user 10. By keeping track of the sessions of the user 10, the voice portal 12 may evaluate performance and increase the complexity of the lessons depending on the performance of the user 10. An exemplary system of the present invention may also recap or summarize the previous sessions if the user 10 is accessing the voice portal 12 after some time interval or if the user 10 requests a review.

Figure 2:
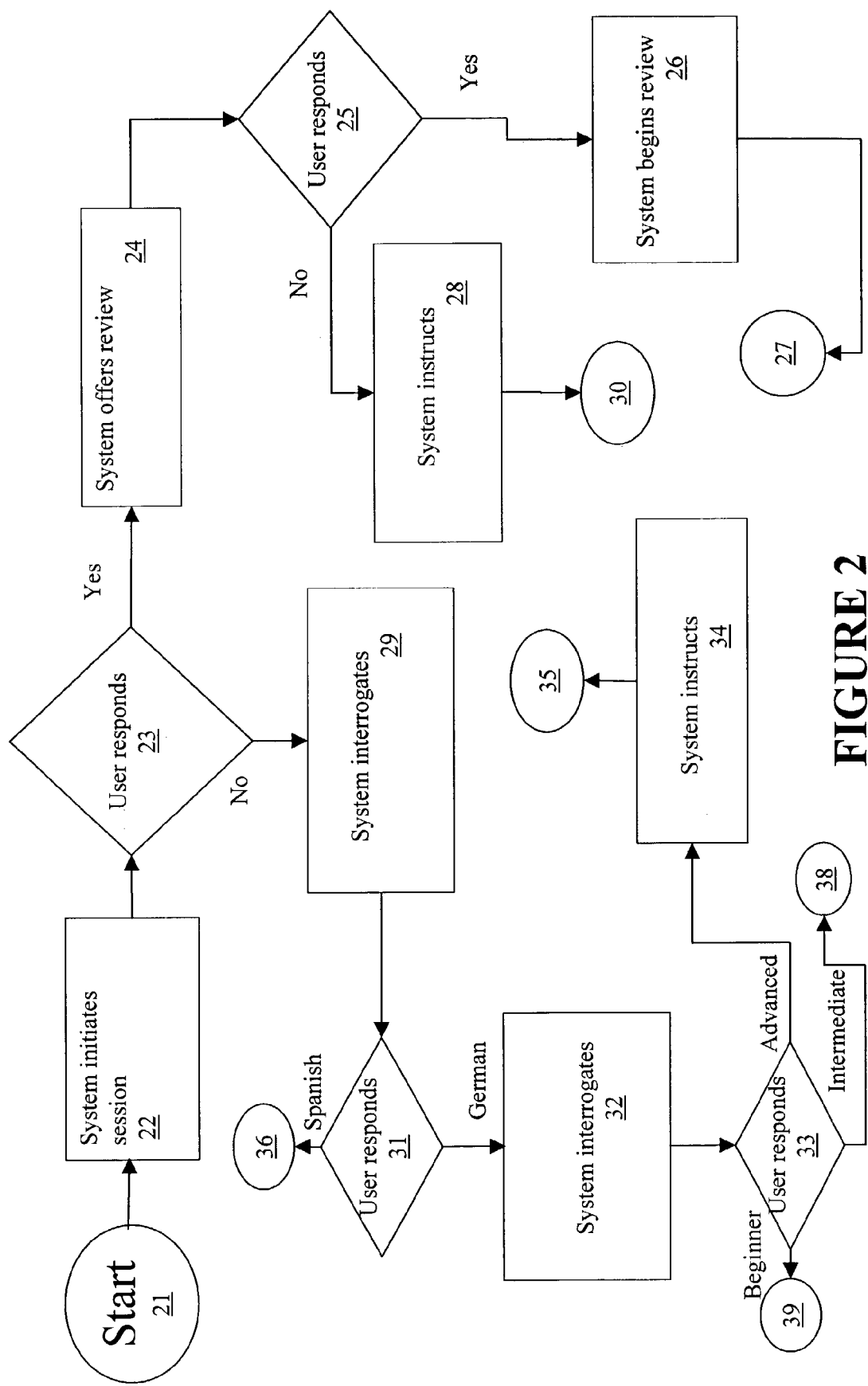
FIG. 2 shows an exemplary method according to the present invention, in the form of a flow chart demonstrating a dialogue structure for a user calling the service.

FIG. 2 shows a dialogue structure that a user may experience when calling the service and initiating an instructional session. FIG. 2 shows an arrangement or configuration in which the user calls the voice portal 12 and selects, within a dialog setting, the language (for example, "French," "Spanish" or "German") and the level (for example, "basic", "intermediate" or "advanced"). The voice portal 12 recognizes these commands and provides the user 10 with a relevant lesson in the selected language.

The flow of FIG. 2 begins at start 21 and proceeds to action 22, in which the system initiates the session. The action 22 may include answering a telephone call to the system, and may therefore represent the initiation of contact with the system. The voice portal 12 may answer the phone call or other contact with a greeting of, for example, "Welcome to the Language Learning Center. From your profile I see that you are currently on French level intermediate. Do you want to continue learning French?" Next, in response 23, the user responds to the interrogatory of the system. If the user responds "yes," then in action 24, the system may offer to review the student's progress by, for example, asking "Do you want to recap your previous session?" After action 24, in response 25, the user responds to the interrogatory of the system, and if the user responds "yes," then in action 26, the system begins to review the lesson by, for example, "Recapping our previous sessions . . ." After action 26, circle 27 may represent the beginning of a review session. If the user responds with a "no" in response 25, then in action 28 the system begins instruction by, for example, providing the message "Continuing intermediate level French class . . ." From action 28, circle 30 may represent the beginning of an instruction session. An example of this instruction session is shown in greater detail in FIG. 3. If the user 10 responds with a "no" in response 23, then in action 29, the system may interrogate the user 10 by providing the message, for example, "Please select a language, for example, German or Spanish." After action 29, in response 31, the user 10 responds to the interrogatory. If the user 10 responds "German", then in action 32, the system interrogates the user 10 by, for example, providing the instructional message "Please select the level of instruction, for example, beginner, intermediate, or advanced." From action 32, in response 33, the user 10 responds to the interrogatory. If the user responds "advanced", then in action 34, the system may begin instruction by providing, for example, the message: "Starting advanced level German class." From action 34, circle 35 may represent the beginning of an instruction session. Alternatively, in response 31, the user may respond "Spanish", which leads to circle 36, which may represent the beginning of another instructional session. Additionally, in response 33, the user may respond "beginner", which leads to circle 38, or "intermediate", which leads to circle 39. Each of circle 38 and circle 39 may represent the beginning of a different instructional session.

Figure 3:
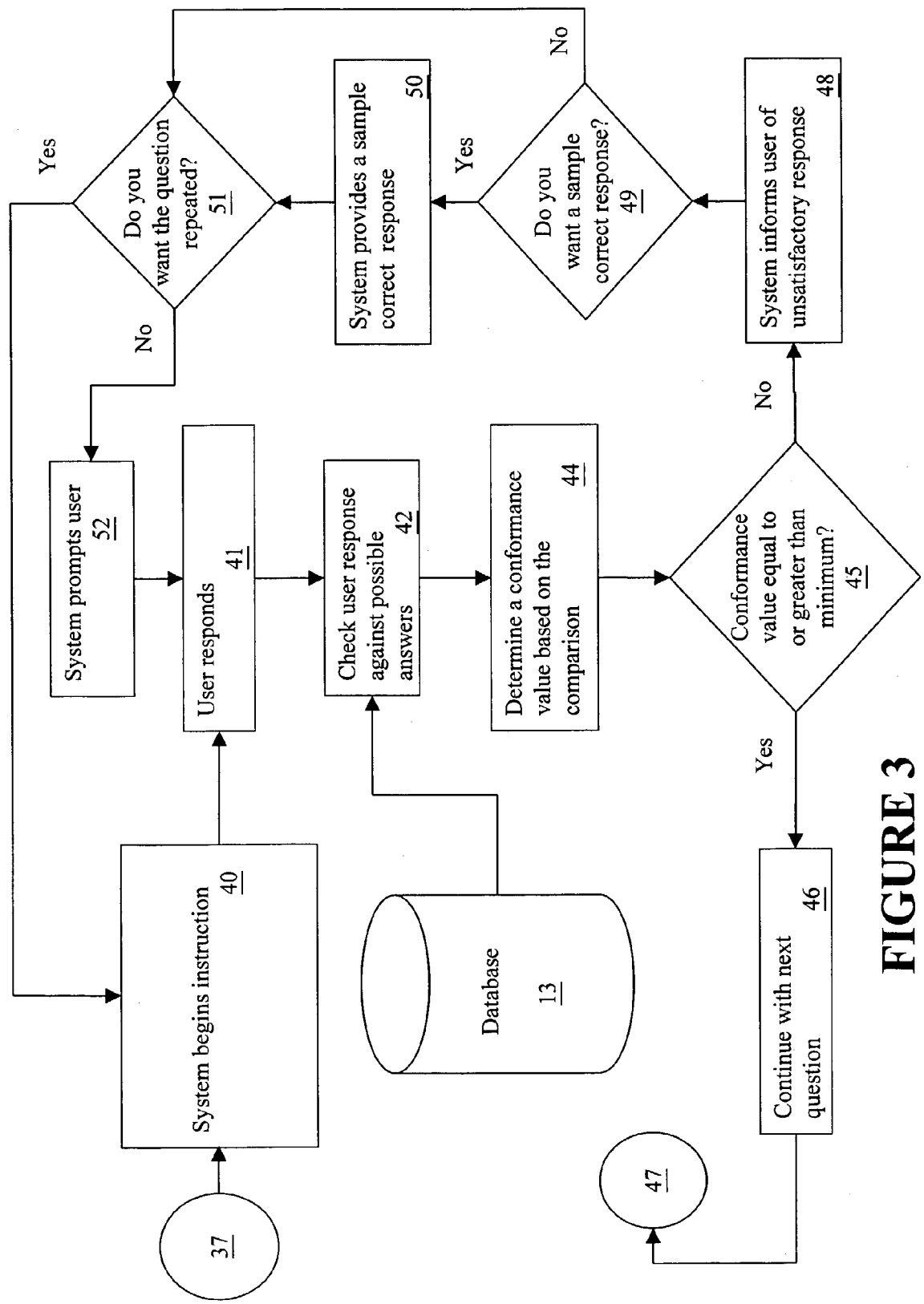
FIG. 3 shows an exemplary method according to the present invention, in the form of a flow chart demonstrating a test environment that provides an interactive learning tool for the users to help improve their language skills in the specified language.

FIG. 3 shows an exemplary test environment to provide an interactive learning tool for users to aid in improving their language skills in the specified language. Specifically, FIG. 3 starts with circle 37, which may represent the same circle 30 from FIG. 2, or may represent another starting point. Proceeding from circle 37 to action 40, the system begins instruction by providing, for example, the message: "Scenario: you meet someone for the first time in a party, how would you greet them, in French." After action 40, in response 41, the user 10 responds. After response 41, in action 42, the user response is checked against possible answers. In action 42, the system may access the database 13. After action 42, in action 44, the system determines a confidence level based on the comparison. Next, at decision-point 45, the system determines whether the confidence level is equal to or greater than an acceptance limit associated with each possible answer. If the confidence level is greater than or equal to the acceptance limit, then action 46 is performed, which indicates to the system to continue with the next question. After action 46, circle 47, may indicate a continuation of the instruction session, including additional scenarios, vocabulary and pronunciation testing, or comprehension skills.

If the response at decision-point 45 is negative, which indicates that the confidence level is less than the acceptance limit, then in action 48, the system informs the user 10 that the response was unsatisfactory. Following action 48, in question 49, the system queries whether the user 10 wants to hear a sample correct response. If the user responds affirmatively, then in action 50, the system provides a sample correct response. Following action 50, in question 51, the system queries the user 10 if the question is to be repeated. If the user responds in the negative, then in action 52, the system prompts the user 10 by providing, for example, the message "Then try again", and returns to action 41.

If the response to question 49 is negative, then the flow may proceed to question 51, and if the response to question 51 is affirmative, then action 40 is performed.

When the user 10 reaches a certain point in the language course, the system may conduct a test to assess the user's progress. Depending on the results of the assessment test, the system may recommend whether the user 10 should repeat the lesson or proceed to the next level.

Another scenario is that the user 10 may practice by repeating the word until the system recognizes the word, or the system may repeat the word after each attempt by the user 10 to pronounce correctly the word until the user correctly pronounces the word. In the pseudo-classroom, the correction of pronunciation and language nuances may be made immediately by the voice portal. For example, the following dialogue may be part of the language instruction:

System: Please say "Telegraphie"<tele'gra:fi>
User: <tele'gra: phe>
System: That is an incorrect pronunciation, please say it again. <tele'gra:fi>.
User: <tele'gra:fi>
System: That's right! Let's go to the next word.

Additionally, the system may test the user 10 in pronouncing groups of words. Term shall mean in the context of this application both single words and groups of words.

Figure 4:
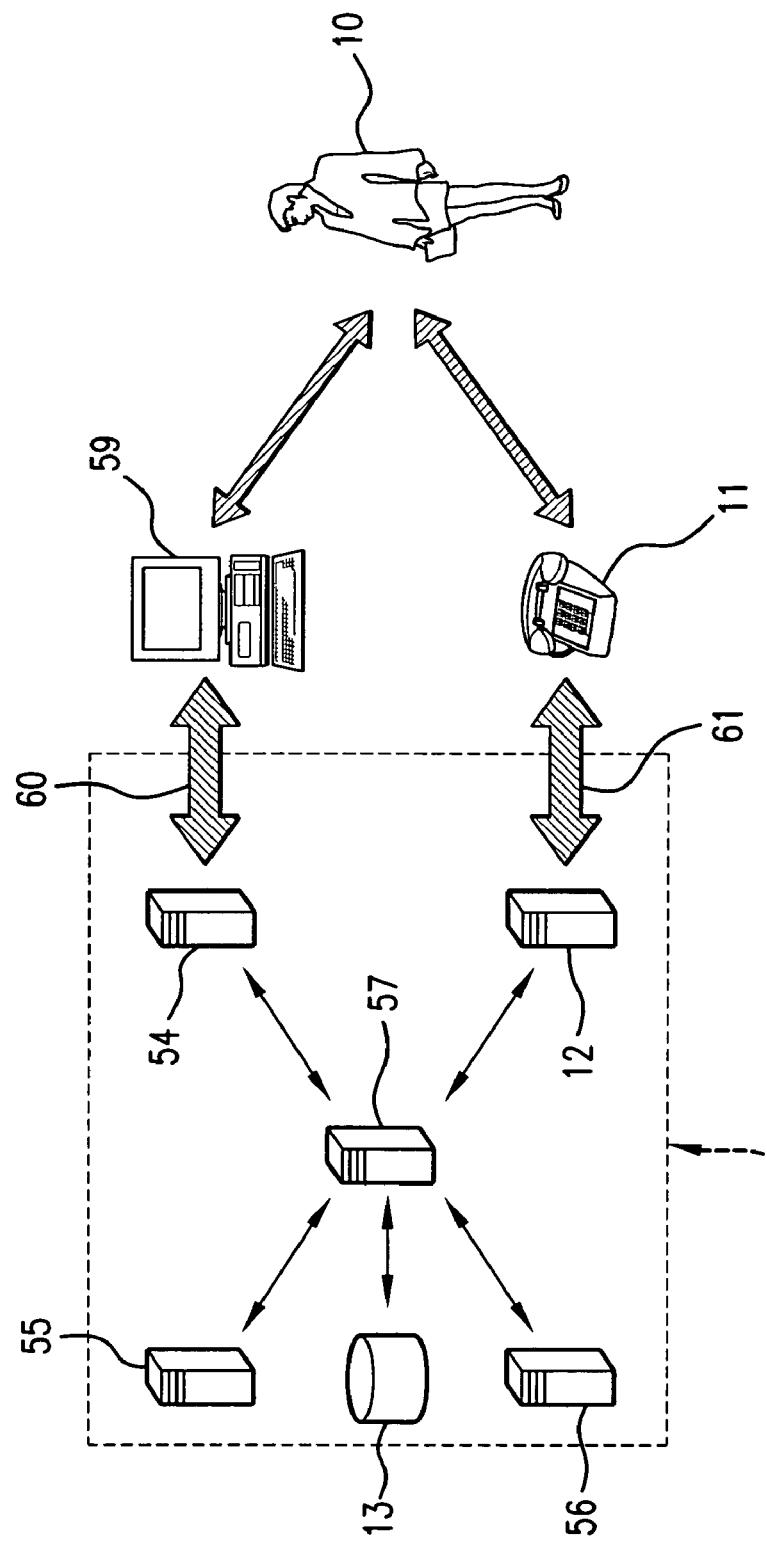
FIG. 4 shows schematically a virtual classroom including components of the voice portal server, interactive units and the user.

FIG. 4 shows an exemplary architecture of a combined voice portal 12 and web portal 54. The user 10 may set a personal profile via a web portal 54. A geo (geography) server 56 may contain country specific or location specific information, E-mail server 55 may send and receive E-mails in the language being learned, the database 13 may include the user profile, language information and correct and incorrect pronunciations. The voice portal 12 may be the main user interface to learn and practice the language skills. An application server 57 may control access to the geo-server 56, E-mail server 55 and the database 13 from the voice portal 12 and the web portal 54. The web portal 54 may be connected to a personal computer 59 via the Internet 60, or another communication network. The web portal 54 may be coupled or connected to the personal computer 59 via the Internet 60, or other communication network. The voice portal 12 may be connected or coupled to the telephone 11 (or other communication device) via a telephone system 61, or other communication network. The geo-server 56, the E-mail server 55, the database 13, the voice portal 12, the application server 57, and the web portal 54 may be collectively referred to as a language learning center 58. Alternatively, the user 10 may access the language learning center 58 without the telephone 11 by using a personal computer 59 having an audio system (microphone and speakers). The user 10 may also access the language learning center 58 without a personal computer 59 by using only the telephone 11, or some other suitably appropriate communication device.

The geo-server 56 may provide location specific information to the user 10 by identifying the location of the user 10 through a GPS system, a mobile phone location system, a user input, or by any other suitably appropriate method or device. The location specific information provided by the geo-server 56 may include the local language, dialect and/or regional accent. For example, the user 10 may call voice portal 12, and ask the question: "How do I say 'where can I get a cup of coffee here?" The geo server 56 may locate the user 10 by a mobile phone location system or a GPS system integrated in the telephone 11. The geo-server 56 may identify the dominant language and any regional dialect for the location of the user 10. This information may be provided to the application server 57 to assist in accessing the database 13. Thus, the voice portal 12 may provide the user 10 via telephone 11 with the foreign language translation of the phrase "Where can I get a cup of coffee?" This information may be provided in the local dialect and accent, if any, and the user 10 may then be prompted to repeat the phrase to test the user's pronunciation skills.

E-mail server 55 may be used to send E-mails to the user 10 for administrative purposes (such as, for example, to prompt the user 11 to call the voice portal 12 for a new lesson), or to teach and/or practice reading and/or writing in a foreign language.

Voice recognition can be divided into two categories: dictation and dialogue-based. Dictation allows the user to speak freely without limitation. As a consequence, however, voice recognition of dictation may require a large amount of processing power and/or a large set of sound-files/grammar-files, possibly pronounced by the user, to effectively identify the spoken word. There may be few algorithmic limitations on normal speech to aid in the identification of the spoken word, and these limitations may be limited to a few grammar rules. On the other hand, a dialogue-based system may be implemented with less processing power and/or fewer or no sound samples from the user. A dialogue-based system may parse a response into grammatical components such as subject, verb and object.

Within each of the parsed components, a dialogue-based system may have a limited number (such as, for example, 15) stored sound files, with each stored sound file associated with a different word. Thus, a dialogue-based system may reduce the level of complexity associated with voice recognition considerably. Additionally, each stored sound file, each parsed grammatical component, or each user response may have an associated acceptance limit, which may be compared to a confidence level determined by the dialogue-based system when associating a particular sound with a particular stored sound file. A high acceptance limit may require a higher confidence level to confirm that the word associated with that stored sound file was the word spoken by the user. This concept may be expanded by using incorrect pronunciation stored sound files. Incorrect pronunciation stored sound files may include the incorrect pronunciation of the word.

The system may be designed so that a particular uttered sound does not lead to confidence levels for two different sounds that may exceed the respective acceptance limits for the different stored sounds. In other words, the prompts from the system to the user 10 may be designed so that acceptable alternative responses would have a low possibility of confusion.

Limits may be provided by using slots, which may be delimited using recognized silences. For example:

"The grass | is | green."
slot 1 | slot 2 | slot 3

The system may be able to correct the user 10, if the user 10 uses a wrong word in slot 2, such as, for example, "are" instead of "is". There may be other solutions to correct grammatical "ordering" mistakes (such as, for example, "The grass green is."). The uttered phrase may be compared for one slot with stored phrases associated with other slots for confidence levels that exceed acceptance limits. If any confidence level exceeds an acceptance limit for an uttered phrase compared with a stored phrase for another slot, then an ordering mistake may be identified. The system may then inform the user 10 of the ordering mistake, the correct order and/or the grammatical rule determining the word order.

For example, if an answer is expected in the form "You | are | suspicious!" (in which a "|" represents a slot delimiter) and the answer is "Suspicious you are", then the slots have to have at least the following entries >slot 1: "you, suspicious", slot 2: "are, you", slot 3: "suspicious, are" <for the two instances to be recognized. While the combination 111 would be the right one, the system would tell the user 10, if it recognizes 222, that the user 10 has made an ordering error. The system may also recognize other combinations as well, such as, for example, 122 if the user stutters, 211, and other mistakes, and could inform the user 10 as necessary.

The application server 57 may manage the call, application handling, and/or handle database access for user profiles, etc.

A pool of stored phrases is defined herein as an edition of words recognizable by the system at a given instance, for example "grass, tree, sky, horse, . . . " For each slot, there can be a different pool of stored phrases. There is an expected diversification of words in each slot, for example:

| slot 1 | slot 2 | slot 3 |
|--------|--------|--------|
| The grass | is | green. |
| Is | the grass | green? |

A more subject-oriented example may be types of greetings, for example:

| How | are | you? |
|-----|-----|------|
| Nice | to meet | you! |
| I | have heard | so much about you! |
| Aren't | you | with Bosch? |

The speech recognition algorithm may recognize silences or breaks and try to match the "filling" (that is, the uttered phrases) between such breaks to what it finds in its pool of stored phrases. The system may start with recognizing "The", but since this is not in slot 1, the system may add the next uttered phrase ("grass") and try again to find a match, and so on. The developer may need to foresee all possible combinations of answers and feed them into the grammar. Even a whole sentence may be in one slot (such as, for example, a slot representing "yes," "That is correct!", "That's right!", "Yepp", etc.)

With respect to mispronounced entries, a recognition engine may be capable of handling user-defined stored sounds. In those stored sounds, the mispronounciation must be "defined", that is, a machine readable wrongly pronounced word must be added (such as, for example, if "car" is the expected word, the pronounciation of "care" or "core" may be used, possibly along with other conceivable mispronounciations). For the system to be able to recognize wrongly pronounced words, those mispronounciations must be known to the system. Otherwise the system may reject them as "garbage" in the best case or interpret them as something else and possibly deliver the wrong error message.

Therefore, in operation, the system may provide a scenario to only allow for a few possible subjects, restricted to what is predefined in the pool of stored sounds.

If a word is grammatically required, it can be made mandatory, that is, there would be a slot for it (such as, for example, to differentiate between wrong pronounciations or even wrong words). Alternatively, the word can be optional (such as, for example, "Grass is green" or "The grass is green"). If the word is optional, there would be no need to reserve a slot. The word may be marked as optional in the "grass" slot. One way to mark a word as optional would be to use an entry like "?the grass". The question mark in front of "the" makes it optional for the recognition engine. Different markings for optional words are also possible.

Figure 5:
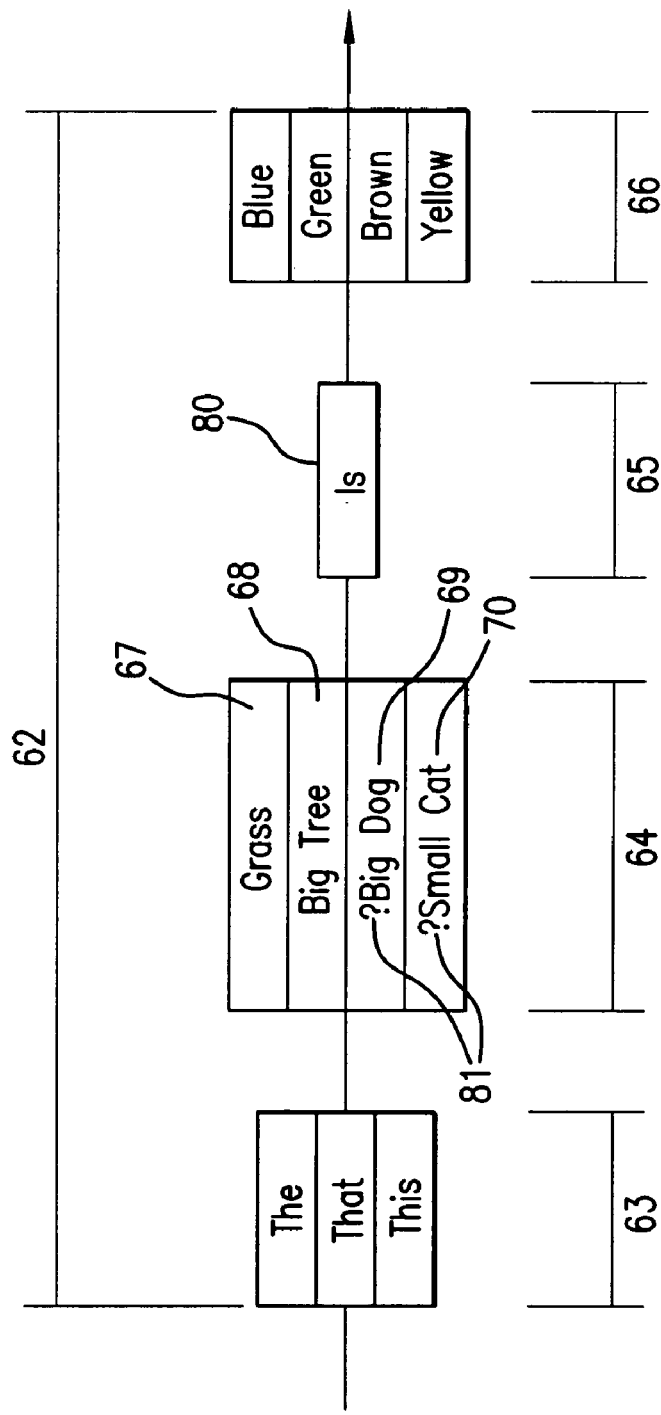
FIG. 5 shows an exemplary response parsed into slots and showing various possible uttered phrases.

An exemplary parsed response is shown in FIG. 5. In FIG. 5, a "?" in front of words indicates they are optional (other recognition engines accept [ ] or other ways to mark optional words). The system query might be: "Please identify the objects around you with their color!"

Valid responses may include:
The grass is yellow.
The grass is green.
That big tree is brown.
This small cat is yellow.

Invalid user responses may include:
That tree is brown.
That small dog is yellow.

The system may reject some responses later on because of context, or language invalidity. For instance:
The cat is green.
That big tree is blue.

In this case, the recognition engine may recognize what the user has said, but the dialogue manager may reject this as an invalid response (although it might be pronounced correctly and semantically correct).

In particular, FIG. 5 shows response 62 divided into slots 63, 64, 65, 68. Each of slots 63, 64, 65, 66 has at least one associated valid response. For instance, slot 64 has valid responses 67, 68, 69, 70. Slot 65 has valid response 80. Valid responses may have one word (such as, for example, valid response 67 has "grass"), or more than one word (such as, for example, valid response 68 has "big tree"). Additionally, valid responses may include optional word delimiters 81. Optional word delimiter 81 indicates that the word following optional word delimiter 81 in the valid response may be present or may be absent.

The exemplary embodiments and methods of the present invention described above, as would be understood by a person skilled in the art, are exemplary in nature and do not limit the scope of the present invention, including the claimed subject matter.

What is claimed is:

1. A method of teaching a user pronunciation, comprising:
  (aa) establishing a voice interactive telephone call between the user and a voice portal server;
  (a) communicating a model term by the voice portal server to the user;
  (b) detecting a response term by the user, the response term being provided to the voice portal server;
  (c) comparing the response term to the model term with a processor coupled to the voice portal server;
  (d) determining with the processor a confidence level by comparing the response term to the model term;
  (e) comparing with the processor an acceptance limit to the confidence level;
  (f) confirming with the voice portal server a correct pronunciation of the model term if the confidence level is not less than the acceptance limit;
  determining a location of the user; and
  determining one of a dominant language and regional dialect based on the determined location of the user;
  wherein the confirming the correct pronunciation is based on the determined one of dominant language and regional dialect.

2. The method of claim 1, wherein the model term is one of audible and written.

3. The method of claim 1, further comprising:
  repeating (e) to (f) with another model term substituted for the model term.

4. The method of claim 1, wherein the pronunciation is of a foreign language.

5. The method of claim 1, further comprising:

informing the user with the voice portal server of an incorrect pronunciation of the model word if the confidence level is less than the acceptance limit.

6. The method of claim 5, further comprising: repeating the model term to the user by the voice portal server.

7. The method of claim 1, wherein the comparing of the response term to the model word includes accessing the model term from a database.

8. The method of claim 1, wherein the telephone call is established by the user dialing a telephone number to access the voice portal, and the voice portal answering the telephone call.

9. The method of claim 1, further comprising:

assessing the user's language proficiency; and selecting a lesson plan based on the assessed language proficiency.

\* \* \* \* \*